Oct. 11, 1960
M. ZAJAC
2,955,577
DECELERATING VALVE UNIT FOR MACHINE TOOLS AND THE LIKE
Filed Nov. 4, 1957
2 Sheets-Sheet 1
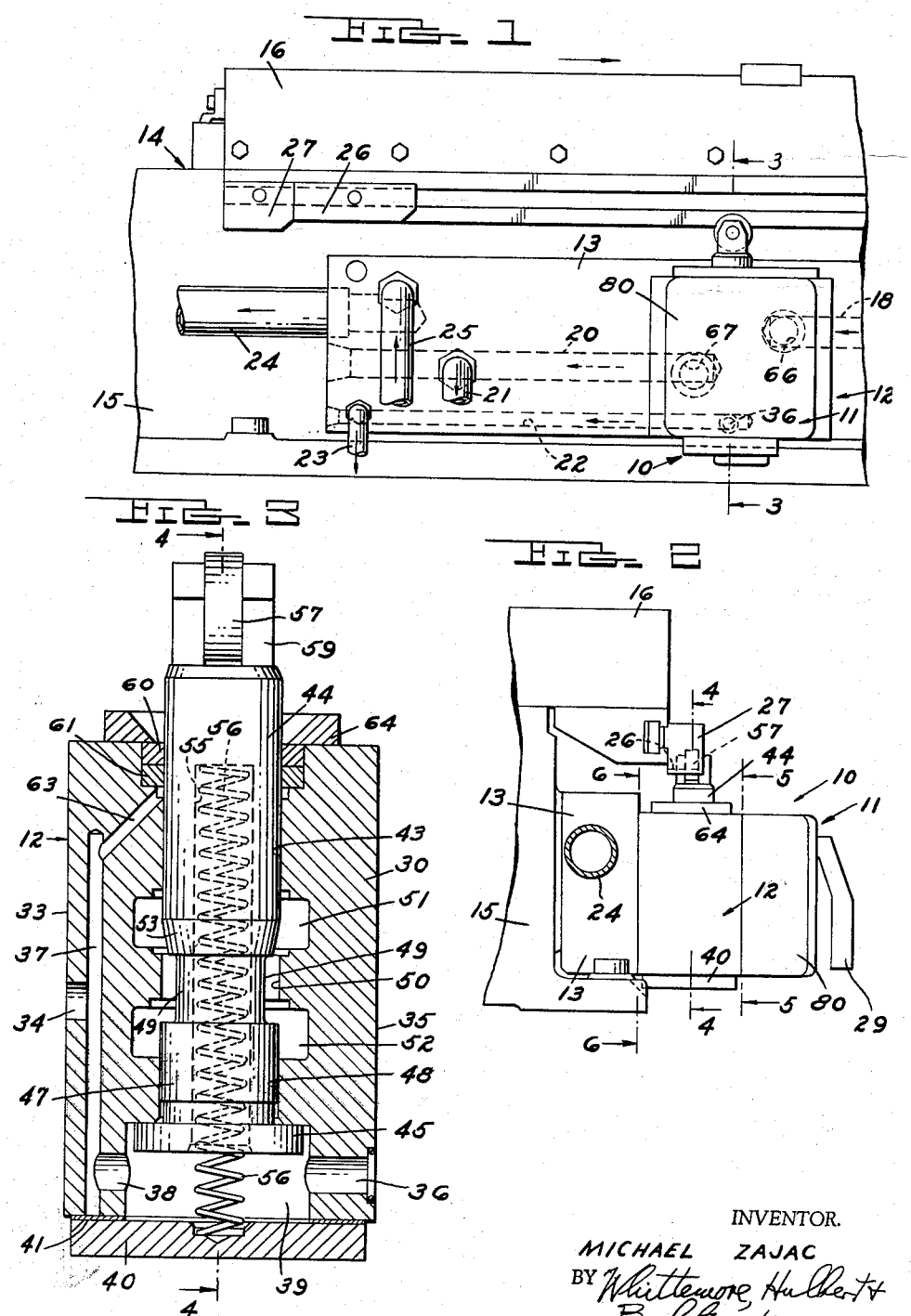
INVENTOR.
MICHAEL ZAJAC
BY Whittemore, Hulbert &
Belknap
ATTORNEYS Oct. 11, 1960  M. ZAJAC  2,955,577
DECELERATING VALVE UNIT FOR MACHINE TOOLS AND THE LIKE
Filed Nov. 4, 1957  2 Sheets-Sheet 2
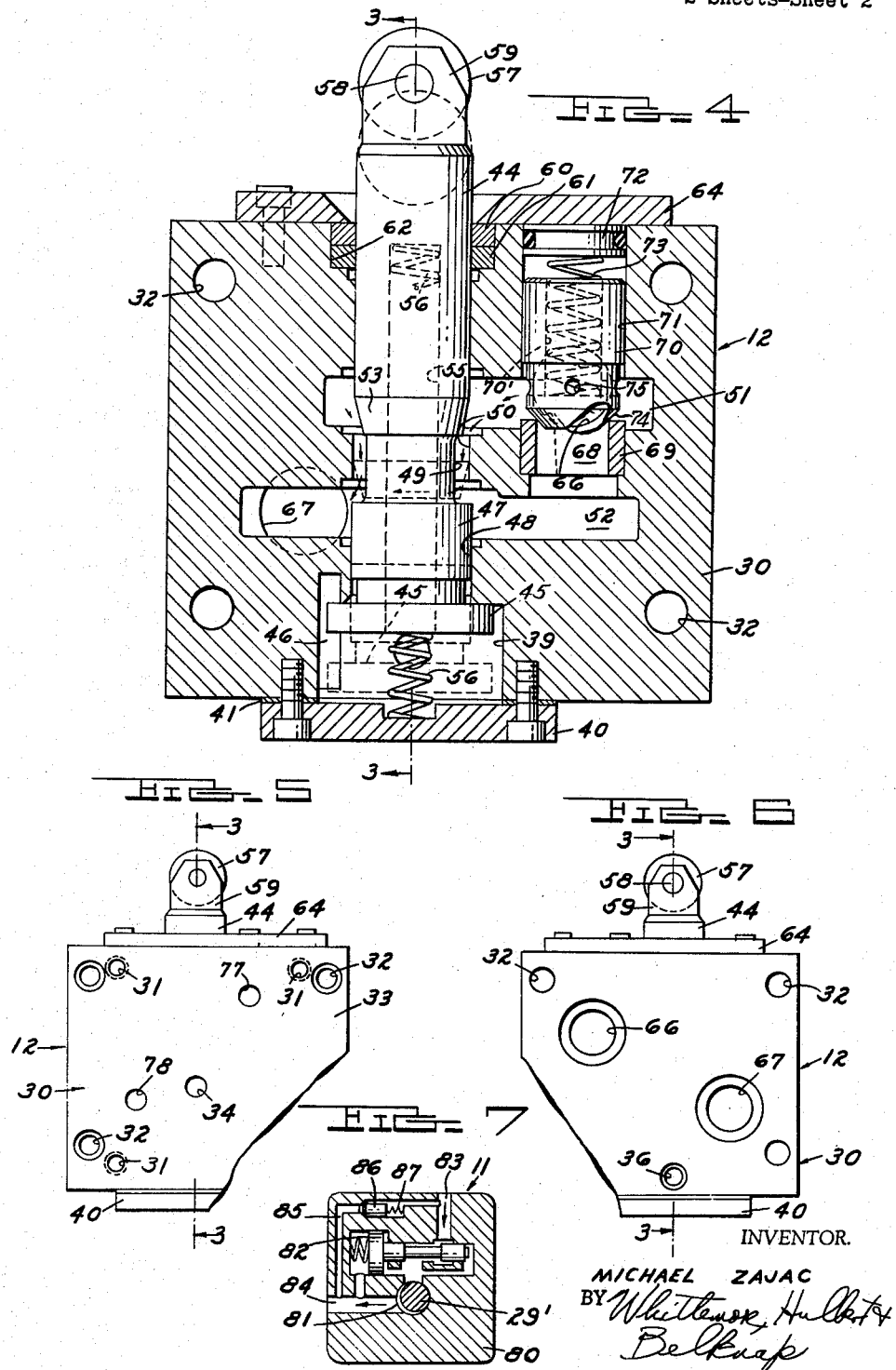
INVENTOR.
MICHAEL ZAJAC
BY
ATTORNEYS

# United States Patent Office 2,955,577
Patented Oct. 11, 1960

2,955,577

DECELERATING VALVE UNIT FOR MACHINE TOOLS AND THE LIKE

Michael Zajac, Detroit, Mich., assignor to Buhr Machine Tool Company, Ann Arbor, Mich., a corporation of Michigan Filed Nov. 4, 1957, Ser. No. 694,226

8 Claims. (Cl. 121—45)

The present invention relates to improved and simplified decelerating valve provisions, particularly devised to control the speed of stroke of a hydraulically powered tool bearing saddle which operates to advance an operating tool at variable speed toward a work piece being machined, and to retract the tool.

As illustrated herein, comparable but reverse decelerative and accelerative speed change phases are accomplished on the respective operating and return strokes of the tool. However, it will be evident to those skilled in the art as the description proceeds that the hydraulic control is also well suited for use in other applications or settings wherein it is desirable to employ a simple and compact valve assembly to obtain a varying speed or operating pressure in a hydraulically powered instrumentality.

It is a general object of the invention, in the illustrated embodiment, to provide an extremely compact, self-contained decelerating valve or like speed control unit for a hydraulic machine tool which is applicable to such tool with a minimum of ease and expense, primarily due to the fact that it considerably simplifies the hydraulic manifolding provisions necessary to construct or convert an existing tool for the desired speed control.

More specifically, it is an object of the invention to provide a speed control unit comprising an improved basic decelerating valve applicable directly to the machine tool manifold, and a flow control valve (which may be of conventional character) mounted directly on the decelerating valve, thereby making it unnecessary to specially manifold the machine tool base to handle the flow of hydraulic liquid in normal and decelerating speed phases.

The entire flow of liquid, in so far as the desired decelerative effect is concerned, takes place through the compounded decelerating-flow control valve assembly of the invention.

Still more specifically, it is an object of the invention to provide a decelerating control in the form of a compact and inexpensive, direct-compounded and self-contained deceleration and flow control valve assembly which is automatically operated by a machine tool or like saddle whose speed is to be controlled. In such an operation, actuation of a cam follower of the deceleration valve by a cam dog on the saddle causes that valve to bypass hydraulic liquid directly through the conventional flow control valve, thereby imposing a variably regulable opposition to hydraulic flow in the compounded assembly, and correspondingly dropping the speed of advance of the tool saddle.

In the past, it has been customary to accomplish this result by the mounting of one or more flow control valves, depending on the number of speed phases, directly to the hydraulic manifold on the machine tool base, requiring special machining of the manifold for the individual flow control units. It is thus seen, that the compounded decelerating-flow control valve assembly, featuring a "piggy-back" or surmounted disposition of one valve unit on the other, greatly simplifies an installation in regard to necessary manifolding.

It is equally evident that a compounded control unit of this type is optionally applicable at any desired point or points on various types of machine tool bases. That is, the compound assembly may be considerably standardized in its structure, for ready application at optional locations on the base manifolds of hydraulically powered and controlled machinery of different sorts.

The foregoing, as well as other objects, will be made more apparent as the description proceeds, especially when considered in connection with the accompanying drawings, wherein:

Fig. 1 is a fragmentary side elevational view showing a conventional type of hydraulically powered and controlled machine tool structure having the improved assembly of the invention applied thereto, a control finger piece of the conventional flow control unit of the assembly being omitted for increased clarity.

Fig. 2 is a fragmentary view in end elevation as viewed from the left of Fig. 1, showing the finger piece referred to above;

Fig. 3 is an enlarged view in transverse vertical section through the flow control unit of the assembly, as on line 3—3 of Figs. 1, 4, 5 and 6;

Fig. 4 is an enlarged view in longitudinal vertical section through the decelerating valve unit, as on line 4—4 of Figs. 2 and 3;

Figs. 5 and 6 are, respectively, fragmentary front and rear side elevational views of the decelerating valve as viewed on lines 5—5 and 6—6 of Fig. 2, i.e., showing the faces of the mounting body of the valve unit which engage the flow control unit and the machine base manifold, respectively; and Fig. 7 is an entirely schematic view in vertical section through a typical flow control unit suitable for use in the improved assembly.

Referring first to Figs. 1 and 2 of the drawings, the reference numeral 10 generally designates the improved compounded, sur-mounted or "piggy-back" assembly of a conventional flow control valve 11 and the second basic component of the assembly, a decelerating valve 12 according to the invention. The assembly 10 is shown as operatively applied to the hydraulic manifold 13 of a hydraulically powered and controlled boring or like machine tool, generally designated 14, whose power cylinder (not shown) is of the known meter-out type. Only parts of this equipment to which the invention applies are illustrated, namely, its fixed base 15, to the side of which the manifold is bolted, and a tool carrying saddle 16 reciprocable longitudinally on the base 15, with the direction of an operating stroke of the saddle 16 shown by upper horizontal arrow in Fig. 1.

The manifold 13 is conventionally equipped with internal and external conduitry, including an internal hydraulic supply passage 18 appropriately connected with the forward, meter-out side of the power cylinder and piston (not shown) of the installation, and an internal longitudinal discharge passage 20 appropriately connected, as by an external discharge pipe or conduit 21, with a tank or other receiver (also not shown). Internal and external manifold drainage lines 22, 23, respectively, are provided, by which the assembly 10 of the invention is drained, and an external manifold tube 24 is also shown. This leads from a conduit of the manifold 13, which is connected to a pump pressurized line 25, to the rear of the base 15 of the equipment, where it is suitably connected with the rear of the power cylinder (not shown) to operate the saddle 16 on its work stroke.

It will be understood that the manifold conduit 18 is supplied from a similar power cylinder line. All of these hydraulic connections are entirely conventional and constitute no part of the present invention.

The tool carrying saddle 16 is provided on the side thereof adjacent the decelerating control assembly 10 with one or more fixedly but adjustably mounted cam dogs 26, 27, which in their reciprocatory movement on the saddle override the control assembly 10 to operate the latter in a manner to be described.

The flow control unit 11 of the assembly (shown in Fig. 7 and hereinafter briefly described) is, as indicated previously, entirely conventional in nature. It may be a type manufactured by Vickers Inc. of Detroit, Michigan and identified as the Vickers Flow Control Valve for Hydraulic Systems, FCG–02–500. Its operation is to impose resistance, as variably regulated by manipulation of an external finger piece 29, to flow of the hydraulic power liquid as such liquid is bypassed therethrough from valve unit 12 in the operation of the assembly, in a manner to be described. The finger piece 29 has been omitted from Fig. 1 for added clarity.

Referring now in particular to Figs. 3 through 6, the decelerating valve unit 12 takes the form of a suitable block-like valve body or block 30, to one face 33 of which, i.e., the forward face as the assembly is mounted, the flow control unit 11 is bolted, as by the provision of tapped bolt holes 31. The rear face 35 of body 30 is in turn bolted to the adjacent side of the machine base manifold 13, employing the bolt holes 32 extending through the body 30 at its four corners.

The forward face 33 of the decelerating valve body, engaged by the flow control valve 11, is provided with a drain opening 34 receiving drainage from that valve unit, and its opposite face 35 is provided at a lower elevation with an O-ring sealed drain opening 36, which empties to the internal manifold drain pipe 23. Communication of the drain passages 34, 36 is established through an upright bore 37 in the body 30 adjacent its front face 33 and an internal drain port 38 communicating the bore 37 with a central cylindrical chamber 39 in the body 30, from which chamber drain passage or opening 36 opens to manifold 13.

The chamber 39 is closed at its bottom by a closure plate 40, with a suitable gasket 41 interposed; and a cylindrical vertical bore 43 of substantial diameter, coaxial with the cylindrical chamber 39, extends upwardly therefrom through the remainder of the valve body 30.

An automatically controlled valve plunger 44 is slidably mounted in substantially sealed relation to the bore 43, the plunger extending through the top of body 30. This plunger includes a lower, radially enlarged flange or stop shoulder 45 which engages upwardly with the top surface of chamber 39 to limit the upward stroke of the plunger. Shoulder 45 is slotted for sliding engagement with an upright dowel formation, key or pin 46 (Fig. 4) carried by the body in chamber 39, for the purpose of preventing rotation of the plunger in its reciprocatory action.

Upwardly of the stop shoulder 45, the plunger 44 is provided with a cylindrical pilot portion 47 slidably engaging the bore 43 at 48, and above the pilot portion 47 the plunger is of reduced cross sectional diameter at 49, in a zone adapted to act within a connecting passage 50 in the body 30, constituted by an intermediate portion of the bore 43.

Intermediate passage 50 opens at its top and bottom, as shown in Fig. 4, to relatively enlarged horizontal cavities 51, 52, respectively, within the body 30, and the valve plunger 44 carries a downwardly tapered valve nose 53 normally positioned in upper cavity 51 immediately above the intermediate connecting passage 50. It is thus evident that, in the normal position of the plunger 44 shown in Figs. 3 and 4, the cavities 51, 52 are freely communicated for flow through the connecting passage 50, whereas, with the plunger 44 depressed as shown in dotted line in Fig. 4, the valve nose 53 substantially enters and seals the passage 50, interrupting such flow. Only when this happens is the hydraulic power liquid forced to flow through the flow control valve unit 11.

The valve plunger 44 is formed with an internal axial recess 55 of substantial height, opening through its bottom stop shoulder 45, which recess receives a coil compression spring 56 abutting the closure plate 40 at its lower end and acting against the upper end of recess 55 to urge the plunger 44 upwardly. A cam follower roller 57 is journaled at 58 in an external forked upper extremity 59 of the plunger.

With the assembly 10 operatively mounted to manifold 13, the follower roller 57 is adapted to be engaged by the saddle cam dogs 26, 27 (Fig. 2), on the operating stroke of saddle 16, to depress the plunger 44 and shift its parts from their solid line position of Fig. 4 to their dotted line position. Appropriate sealing rings 60, 61 surround the plunger 44 adjacent its top, being disposed in a counterbored top recess 62 of the valve body and, as illustrated in Fig. 3, this recess is downwardly communicated through an inclined drain passage 63 with the drain bore 37 of the valve body 30, to bleed off trapped liquid. A suitable top closure plate 64 screwed on the valve block 30 maintains the seals 60, 61 in position, yet permits ready access to them for inspection or replacement.

Referring now to Figs. 1, 4 and 6, a pressure inlet opening 66 of substantial diameter communicates through the rear or inner face 35 of the valve body with the supply conduit 18 of the machine manifold 13 which comes from the forward, meter-out side of the power cylinder of the machine tool 14. Opening 66 internally communicates with upper body cavity 51, thus to admit hydraulic liquid under full pressure from the manifold to that cavity, from which the liquid normally flows through the open connecting passage 50 to the lower cavity 52. It normally then traverses a return opening or passage 67 of substantial diameter extending from cavity 52 through the same face 35 of the body 30 to the internal manifold return conduit 20 and external pipe or conduit 21, thence to the tank of the installation whence it is re-pumped to the machine tool power cylinder to drive saddle 16.

The cavities 51, 52 are, as shown in Fig. 4, also adapted to be communicated directly with one another through a vertical back flow passage 68, in which an annular valve seat 69 is disposed adjacent the upper cavity 51. A cylindrical, one-way check valve 70 of the plug type is axially aligned with valve seat 69, being guided in an offset cylindrical bore 71 in the upper part of the valve body 30. A disk seal 72 closes the upper end of this bore, being held in place by the plate 64, and a coil compression spring 73 is received in an interior bore 70' of check valve 70. Spring 73 acts between plate 64 and the bottom of bore 70' to urge the check valve downwardly and engage its conical nose 74 against the valve seat 69. Radial drain ports 75 open from the check valve bore 70' to the cavity 51 to enable liquid trapped above the valve to be bled off.

As viewed from its face 35 adjacent the flow control valve unit 11 the decelerating valve body 30 has a laterally opening upper pressure passage 77 (Fig. 5) leading from its pressure intake cavity 51 to the intake side of the flow control valve. It is through the passage 77 that the flow control valve 11 receives hydraulic liquid when the intermediate connecting passage 50 of the body 30 is closed off by plunger 44.

At a lower elevation, the face 35 has a liquid return passage 78 formed therein, leading from the discharge side of the flow control valve 11 to the lower return cavity 52 of valve body 30. It is through the passage 78 that pressure liquid returns from the flow control valve, thence through the return opening 67 of the body 30 to manifold return conduit 20, having been subjected to variable, saddle-decelerative opposition to flow by the valve 11, as regulated by adjustment of the latter's finger piece 29.

It is the function of the check valve 70 to seal off flow from intake cavity 51 through back flow passage 68 on an operating stroke of the saddle 16, attended by the decelerating action described. On the reverse, return stroke, in which the flow of pressure liquid is in the opposite direction, check valve 70 yields upwardly to permit a relatively unimpeded flow from manifold passage 67 through cavity 52 and passage 68 to cavity 51, thence through opening 66 to the manifold 13, whether the plunger 44 seals connecting passage 50 or not.

Schematic Fig. 7 shows a typical control unit 11 suitable for the purposes of the invention, this unit incorporating a built-in check valve. The flow control unit 11 is embodied in a valve body 80 schematically depicted in Fig. 7 (and, of course, calling for an internal structural arrangement, as employed in Figs. 1 and 2, in conformity with the liquid communicating provisions described above). The hand piece 29 carries a stem 29' rotatably mounted in the body 80, with an eccentric enlargement 81 on this stem exerting a metering and flow restrictive action on liquid traversing the unit 10, as determined by the setting of hand piece 29. A spring biased valve plunger 82 acts in the usual way in a chamber in the body 80, between the inlet passage 83 of the latter and its outlet passage 84, the passages 83, 84 respectively communicating with cavity 51 of valve 12 (through passage 77) and with cavity 52 of valve 12 (through passage 78). A reverse flow passage 85 is formed in the body, being controlled by a plug type check valve 86 biased by a spring 87.

Thus, a regulable pressure compensated metering of flow is provided when flow is from the inlet 83 to the outlet 84, and check valve 86 allows a free reverse flow from the outlet to the inlet when this direction of flow is warranted by hydraulic circuit conditions. That is, when the pressure at the outlet 84 exceeds the pressure at the inlet 83 by an amount in excess of the thrust of the check valve spring 87, the valve 86 is forced from its seat to permit flow into inlet passage 83. This spring is a very light one, so that only a negligible back pressure is required to open the check valve.

In the functioning of the above described compound, surmounted control assembly 10, in an approach portion of the operating stroke of the saddle 16 (a relatively rapid speed being desired) the valve plunger 44 remains in its elevated, inoperative position of Figs. 3 and 4, and hydraulic pressure liquid takes the path of least resistance through the decelerating valve unit 12, entering passage 66 and traversing cavity 51, the open connecting passage 50 and cavity 52, thence through return opening 67 to the manifold conduit 20. There is no significant flow through flow control valve unit 11.

The saddle cam dog 26 first to engage the assembly 10 depresses follower roller 57 and valve plunger 44. This causes the plunger valve nose 53 to partially enter and throttle or partially seal off the bypass passage 50 in the valve block (moving toward the position shown in dotted line in Fig. 4), whereupon the pressure liquid is diverted to some extent from cavity 51 through pressure passage 77 in the forward face 33 of the block and into the flow control valve 11. It is there subjected to decelerative opposition to flow prior to returning through passage 78 to cavity 52 and manifold return opening 67. The travel of the saddle 16 is decelerated as desired, as when the tool first engages a work piece.

A further and more pronounced deceleration as when the tool 14 performs a cutting action on the work piece, is accomplished when the second saddle cam dog 27 engages the plunger follower roller 57 the plunger 44 fully enters the pasage 50 to seal off the latter.

It is seen that the invention affords a very compact compound control assembly readily applicable in any desired position on conventional types of hydraulically powered or controlled machine tool or the like, in which the entire flow of control liquid for the speed change operation is internally handled by the assembly alone. Machine manifolding provisions are thus of maximum simplicity and economy.

What I claim as my invention is:

1. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first valve unit having pressure intake and return openings for communication from and to said manifold, respectively, as well as an internal connecting passage adapted to communicate said openings with one another, and a valve member variably movable in said unit in response to movement of said saddle to control opening and closing of said connecting passage, and a further valve unit mounted directly on said first valve unit for communication through the latter with said manifold, said further valve unit variably opposing hydraulic flow therethrough in response to closing and opening of said connecting passage by said valve member.

2. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first valve unit having pressure intake and return openings for communication from and to said manifold, respectively, as well as an internal connecting passage adapted to communicate said openings with one another, and a valve member variably movable in said unit in response to movement of said saddle to control opening and closing of said connecting passage, and a further valve unit mounted directly on said first valve unit for communication through the latter with said manifold, said pressure intake and return passages of the said first unit being in communication with intake and discharge sides of said further valve unit and said further valve unit variably opposing hydraulic flow therethrough from and to said discharge and return openings in response to closing and opening of said connecting passage by said valve member.

3. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first valve unit provided with a valve body having means for the direct application thereof to said manifold and having pressure intake and return openings for communication from and to said manifold, respectively, as well as an internal connecting passage adapted to communicate said openings with one another, and a valve member variably movable in said body in response to movement of said saddle to control opening and closing of said connecting passage, and a further valve unit mounted directly on said first valve unit for communication through the latter with said manifold, said further valve unit variably opposing hydraulic flow therethrough from and to said discharge and return openings in response to closing and opening of said connecting passage by said valve member.

4. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first valve unit provided with a valve body having means for the direct application thereof to said manifold and having pressure intake and return openings for communication from and to said manifold, respectively, as well as an internal connecting passage adapted to communicate said openings with one another, and a valve member variably movable in said body in response to movement of said saddle to control opening and closing of said connecting passage, and a further valve unit mounted directly on said first valve unit for communication through the latter with said manifold, said pressure intake and return passages of the said first unit being in communication with intake and discharge sides of said further valve unit and said further valve unit variably opposing hydraulic flow therethrough from and to said discharge and return openings in response to closing and opening of said connecting passage by said valve member.

5. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first block-like valve unit having a valve body provided with a manifold intake opening and a manifold return opening, and means to mount the same with said openings in hydraulic communication with the manifold, and a further valve unit mounted directly on and in direct hydraulic communication with said valve body to receive and variably oppose liquid flow from the latter, and a valve member movably mounted on said valve body to control flow relatively direct therein from said intake opening to said return openings, or flow therefrom through said further valve unit, said valve member having means externally actuable by said saddle to move the same.

6. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first block-like valve unit having a valve body provided with a manifold intake opening and a manifold return opening, and means to mount the same directly on said manifold with said openings in direct hydraulic communication with the manifold, and a further valve unit mounted directly on and in direct hydraulic communication with said valve body to receive and variably oppose liquid flow from the latter, and a valve member movably mounted on said valve body to control flow relatively direct therein from said intake opening to said return openings, or flow therefrom through said further valve unit, said valve member having means externally actuable by said saddle to move the same.

7. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first block-like valve unit having a valve body provided with a manifold intake opening and a manifold return opening, and means to mount the same with said openings in hydraulic communication with the manifold, and a further valve unit mounted directly on and in direct hydraulic communication with said valve body to receive and variably oppose liquid flow from the latter, said body of said first valve unit being provided with a connecting passage adapted to communicate its intake and return openings with one another, and with a passage further communicating said intake opening with an intake side of said further valve unit, and a valve member movably mounted on said valve body to control flow therein from said intake opening through said connecting passage to said return openings, said valve member having means externally actuable by said saddle to move the same.

8. In combination with a machine tool having a frame, a saddle mounted for longitudinal travel on said frame in a variable speed stroke and under actuation by hydraulic power, and a hydraulic manifold on said frame transmitting hydraulic liquid for such actuation, a hydraulic control unit mounted on said frame and controlling flow of liquid in the manifold, comprising a first block-like valve unit having a valve body provided with a manifold intake opening and a manifold return opening, and means to mount the same directly on said manifold with said openings in direct hydraulic communication with the manifold, and a further valve unit mounted directly on and in direct hydraulic communication with said valve body to receive and variably oppose liquid flow from the latter, said body of said first valve unit being provided with a connecting passage adapted to communicate its intake and return openings with one another, and with passages further communicating the same respectively with an intake and a return side of said further valve unit, and a valve member movably mounted on said valve body to control flow therein from said intake opening through said connecting passage to said return openings, said valve member having means externally actuable by said saddle to move the same.

References Cited in the file of this patent
UNITED STATES PATENTS

| 2,392,422 | Stephens | Jan. 8, 1946 |
| 2,499,425 | Stephens | Mar. 7, 1950 |
| 2,658,342 | Bannister et al. | Nov. 10, 1953 |
| 2,710,597 | Ineichen | June 14, 1955 |
| 2,745,433 | Schneider et al. | May 15, 1956 |
| 2,774,192 | Grobey | Dec. 18, 1956 |
| 2,847,030 | McRae | Aug. 12, 1958 |
| 2,873,762 | Tennis | Feb. 17, 1959 |